United States Patent [19]

Collier et al.

[11] 4,130,506

[45] Dec. 19, 1978

[54] METAL POWDERS

[75] Inventors: Owen N. Collier; Stephen J. Hackett, both of London, England

[73] Assignee: Johnson, Matthey & Co., Limited, London, England

[21] Appl. No.: 702,727

[22] Filed: Jul. 6, 1976

[30] Foreign Application Priority Data

Jul. 4, 1975 [GB] United Kingdom ............... 28264/75

[51] Int. Cl.$^2$ ......................... B01J 21/04; B01J 21/08; B01J 23/40; B01J 23/48
[52] U.S. Cl. .................................. 252/438; 252/443; 252/455 R; 252/460; 252/463; 252/466 PT; 252/472; 252/476; 75/0.5 A; 427/217
[58] Field of Search ................... 252/472, 476, 455 R, 252/460, 463, 466 PT, 438, 443; 427/217; 428/329, 403, 404, 472; 75/0.5 A, 0.5 AB

[56] References Cited

U.S. PATENT DOCUMENTS

| | | | |
|---|---|---|---|
| 2,424,085 | 7/1947 | Bergsteinsson et al. | 427/217 X |
| 2,475,155 | 7/1949 | Rosenblatt | 252/460 |
| 2,853,398 | 9/1958 | Mackiw et al. | 427/217 |
| 3,635,761 | 1/1972 | Haag et al. | 427/217 |
| 3,887,491 | 6/1975 | Ramirez et al. | 252/476 X |

*Primary Examiner*—W. J. Shine
*Attorney, Agent, or Firm*—Cushman, Darby & Cushman

[57] ABSTRACT

This invention relates to metal powders which will withstand high temperatures and which can be used for decorative and catalytic purposes. In more detail, a metal powder in accordance with the invention comprises particles made from a heat resistant substrate individually coated or encapsulated with a layer of platinum, palladium, rhodium, ruthenium, iridium, osmium, gold or silver or an alloy containing at least one of the said metals.

5 Claims, No Drawings

METAL POWDERS

This invention relates to metal powders. In particular, the invention provides a novel metal powder which will withstand high temperatures, and means for its production. The metals for which the invention will have special application are platinum, palladium, rhodium, ruthenium, iridium, osmium and gold and silver.

A disadvantage of using metal powders at high temperatures, particularly temperatures approaching or exceeding the melting point of the metal, is that the metal, even if it does not actually melt, tends to sinter. Thus, the individual metal powder particles tend to fuse together and form agglomerates or aggregates with the result that the physical properties associated with the metal in powder form are destroyed.

In the case of a metallic gold powder which is frequently incorporated in decorative compositions applied to, for example, ceramic ware, the decorated ware is fired at temperatures in the region of 860° C. However, if firing of the decorated ware is carried out at higher temperatures such as those up to and exceeding the melting point of gold, the resultant gold decoration (usually in the form of a film) shows improved chemical and mechanical durability. Further, for some time there has been a need for gold decorations which may be fired at temperatures equal to those used for fire resistant decorations, that is at temperatures at which the glaze composition is soft. Such temperatures generally lie between 1200° C. and 1400° C.

In this specification, reference to high or higher temperatures refers to temperatures up to and exceeding by, for example 100° C. to 150° C., the melting point of the metal concerned. In the case of gold, the said high temperature would be in the region of 1400° C.

It is an object of the present invention to provide a metal powder which, at temperatures approaching, equal to or exceeding the melting point of the metal, does not suffer from the foregoing disadvantage.

According to one aspect of the invention, a metal powder suitable for use at high temperatures comprises particles made from a heat resistant substrate, individually coated or encapsulated with a layer of platinum, palladium, rhodium, ruthenium, iridium osmium, gold and silver or an alloy containing one of said metals. According to a further feature of the invention, the metal constitutes between 50 and 95 weight %, e.g. 50 to 65 weight %, of the total weight of the powder.

The heat resistant substrate may be made from any material from the range of naturally-occurring and synthetic refractories. Examples of naturally-occurring refractories are clays, silica, alumina, titania, zirconia and/or mixtures of these and examples of synthetic refractories are silicon nitride, silicon carbide and/or mixtures of these.

It is another object of the invention to provide a method of making a metal powder according to the first aspect of the invention and comprising coating or encapsulating particles of a heat resistant substrate with a layer of platinum, palladium, rhodium, ruthernium, iridium, osmium, gold and silver or an alloy containing one of said metals.

Powder in accordance with this invention is eminently suitable for incorporation in a decorative composition for firing onto ceramic and other ware. The powder of the invention may also be used as a catalyst.

We already known that, in the manufacture of a metal powder for use at ordinary temperatures, by which is meant temperatures significantly below the melting point of the metal or alloy concerned, control over the particle size distribution can be exercised by a precipitation technique involving the stages of nucleation and controlled growth. We have now found, surprisingly, that the application of this technique to heat resistant substrates yields metal powders having remarkable high-temperature properties.

Broadly speaking, therefore, the method of the present invention includes the steps of nucleating the metal, for example gold, or alloy onto the surface of the substrate particles and then growing further metal or alloy in bulk onto the resulting nuclei. The resultant metal or alloy film or coating forms an encapsulation around each particle of the substrate. It is generally necessary, in order to produce and to reproduce consistently a metal powder in which the particles are of the desired size and the encapsulation is of the desired thickness, to control closely the steps of nucleation and growth.

The method will now be described in greater detail by way of example.

A first stage of the process is to activate the substrate. By "activate" we mean to ensure that the maximum surface area of the substrate becomes available for nucleation and subsequent growth. Methods of activation vary according to the nature of the substrate. For example, activation of a clay or a naturally-occurring mineral can be achieved by boiling it in water. Optionally, the water may also contain a solution of a strong reducing agent, such as hydrazine hydrate or sodium sulphite. An alternative activation procedure for a clay or a naturally-occurring mineral is to boil it in dilute mineral acid. On the other hand, an activation procedure for a synthetic refractory compound, if the inherent activity is too low, is to deposit active sites on the surface of the refractory. This may be carried out by using any or all of the methods of preparing ceramic and other heat resistant substrates for catalytic purposes, which methods are well known to those skilled in the art.

A second stage of the process is to nucleate particles of metal onto the surface of the activated substrate particles and this may be achieved by adding a suspension of the substrate particles in the activating agent to an aqueous solution of a salt of the metal or applying an organo compound of the metal and subsequently decomposing the same.

By way of example and with particular reference to gold powders, nucleation may be achieved by dispersing the refractory substrate particles in a solution of an organic sulphur-containing gold compound in an organic solvent, evaporating the solvent and thermally decomposing the gold compound.

Nucleation is then initiated by reducing the metal, e.g. gold salt, with a strong reducing agent which may be that already optionally present in the activation solution. If no reducing agent is present in the activation solution, nucleation may be induced by adding a strong reducing agent to the suspension of substrate in the mixture of activating agent and metal salt solution. The chemical nature of the strong reducing agent added to initiate nucleation may be similar to that of the reducing agent added to the activation solution, that is to say, hydrazine hydrate or sodium sulphite, for example. Vigorous stirring is desirable at this stage to ensure adequate and uniform dispersion of the substrate particles in the metal salt solution.

We prefer to add to the solution of metal salt, prior to the addition of the suspension of substrate particles in the activation solution, a colloidal protective agent. This agent controls nucleation and prevents agglomeration of the nucleated substrate particles. Examples of suitable colloidal protective agents are gum acacia, gelatin, egg albumin and dextrin, but in general the requirements of the colloidal protective agents are that they should have a high molecular weight and be capable of being adsorbed onto the surface of the nucleated substrate particles so that their agglomeration is physically prevented.

A third stage of the process is to grow further metal in bulk on the nuclei already present on the substrate surface. This is achieved by adding to the second-stage suspension a weak reducing agent, such as hydrogen peroxide or hydroquinone, for example. We prefer to add the reducing agent in portions and any foam generated may readily be suppressed by a spray of, for example, isopropanol. After all the weak reducing agent has been added, the suspension is stirred for some hours to complete the growth stage of the process. The resulting metal powder is then filtered off, washed and dried.

It is, of course, possible to provide a metal powder by combining the stages of nucleation and growth into a one-step process, using either a strong reducing agent alone or a weak reducing agent along instead of the former followed by the latter. We have found, however, that the use of a strong reducing agent alone results in rapid nucleation and a fast growth rate; the two stages overlap and control of the process is poor. The use of a weak reducing agent alone improves the process control somewhat, but in these circumstances, the nucleation stage is somewhat slow and more difficult to control than compared with the case where a strong reducing agent is used. As the time factor is increased by slowing the rate of reduction, side effects occur, such as nucleation and growth on dust particles, the walls of vessels and stirrers and the like.

The method will now be described by means of the following Examples, in which the preparation of a gold powder according to the invention is described.

EXAMPLE 1

75.0g of gold as gold ammonium chloride was dissolved in 2.4 liters of distilled water in a 5 liter beaker. 40 ml of a 10% gum acacia solution was added and the mixture stirred to ensure complete dissolution of the gold salt. Meanwhile, 25g of china clay was activated by boiling in 100 ml of distilled water containing 10 drops (≡ 0.45 ml) of a 6% hydrazine hydrate aqueous solution. The china clay/hydrazine hydrate suspension was then added with vigorous stirring to the gold solution. Upon addition, the colour of the mixture changed from yellow to yellow-green. After stirring for 10 minutes, 400 ml of "40 volume" hydrogen peroxide was added, as a result of which the colour changed from green to brown and foam was formed from reaction gases generated. The foam was suppressed using the minimum quantity of isopropanol from a laboratory spray. After 10 minutes, a further 100 ml of "40 volume" hydrogen peroxide was added, which caused further foaming, and the final 100 ml of hydrogen peroxide was added after a further 10 minutes. The reaction mixture was then stirred for 5 hours to complete the reaction, after which the clear supernatant liquor was decanted off and the powder was filtered off, washed and dried until constant weight was achieved.

EXAMPLE 2

80g of gold as gold ammonium chloride was dissolved in 2 liters of distilled water in a 5 liter beaker. 40 ml of a 10% aqueous gum acacia solution was added and the mixture stirred to ensure complete dissolution of the gold salt. Meanwhile, 20g of bentonite was activated by boiling in 200 ml of distilled water containing 0.45 ml of an aqueous 6% hydrazine hydrate solution. The bentonite/hydrazine hydrate mixture was then added with vigorous stirring to the gold solution. After stirring for 10 minutes, a 6% hydrazine hydrate aqueous solution was added to the mixture until the reaction was complete. The foam formed from the reaction gases generated was suppressed using the minimum quantity of isopropanol spray. When the reaction was complete the gold/bentonite composite was allowed to settle, the clear supernatant liquor was decanted off and the powder was filtered, washed and dried to constant weight.

EXAMPLE 3

80 g of gold as gold ammonium chloride was dissolved in 2 liters of distilled water in a 5 liter beaker. 40 ml of a 10% aqueous gum acacia solution was added and the mixture stirred to ensure complete dissolution of the gold salt. Meanwhile, 20g of zirconium dioxide powder was dispersed in 100 ml of water containing 0.45 ml of 6% hydrazine hydrate aqueous solution. The zirconia/hydrazine hydrate suspension was boiled and added with vigorous stirring to the gold solution. After stirring for 10 minutes, a solution of 200g of sodium sulphite dissolved in 1 liter of water was added. The reaction was complete within 10 minutes. The resulting powder was allowed to settle and the supernatant liquid was decanted off. The powder was filtered, washed free from dissolved salts and was dried to constant weight.

EXAMPLE 4

90 g of platinum as sodium chloroplatinate was dissolved in 1500 ml water in a 5 liter beaker. 50 ml of a 10% aqueous gum acacia solution was added and the mixture was thoroughly stirred to allow the platinum salt to dissolve. Meanwhile, 10g china clay was dispersed in 125 ml of a 1% hydrazine hydrate solution by boiling for 5 minutes. The clay dispersion was added to the platinum salt solution during vigorous stirring. After stirring for 10 minutes, sufficient aqueous 6% hydrazine hydrate solution was added to bring the reaction to completion. The resulting powder was allowed to settle, washed and dried to constant weight.

Each of the resulting gold powders was eminently suitable for use as a pigment in a "burnish gold" preparation for decorating pottery and porcelain and for firing at high temperatures. Firing schedules for decorations and in common use at present, employ a peak temperature of about 800° C., but modern furnaces are designed to operate at temperatures up to about 1050° C. (for chinaware) and up to about 1400° C. (for porcelain). At these temperatures, using burnish gold preparations containing standard gold powders, breakdown of the film occurs due to the gold sintering and forming into agglomerates. However, using a gold powder according to the invention, the resulting film has surprisingly high cohesive properties at temperatures as high as 1400° C. and the spatial configuration of the gold powder particles in the film is maintained. The resulting films are capable of being burnished to a continuous decorative film with good adhesion and no wrinkling.

Although the invention has been exemplified with reference to the preparation of a gold powder for use in a burnish gold preparation for pottery and porcelain decoration, it is to be emphasized that the method of production may equally be applied to making metal powders of the platinum group metals and silver or alloys containing one of these metals, and uses are by no means limited to the decoration of pottery and porcelain. Metal powders according to the invention maintain their spatial configuration at high temperatures, in whatever application to which they are submitted. Powders according to the invention have the properties of the metals at ordinary temperatures, in that they can be formed into shapes, for example, and in addition the substrate particles provide a rigidity and dimensional stability at high temperatures that would cause an ordinary metal powder to break down.

One advantage of a metal powder according to the invention is that economy of the metal is achieved, as the particulate substrate can be considered as an "extender" which does not "dilute" or weaken in any way the physical properties of the metal, which is the case with the usual extenders which are used in the form of an intimate mixture or dispersion in the untreated metal powder.

Examples of some disadvantages of the platinum group metals and silver at high temperatures, which could be overcome by using the metal in the form of a metal powder according to the invention, are as follows:

Alloys of platinum and rhodium, near their softening point, lose their cohesive strength with the result that faults such as sagging develop. Therefore, according to the invention, thinner than normal sections of metal may be prepared by powder metallurgy.

Adjacent spirals of resistance thermometer elements tend to fuse together, causing short circuits.

During the metallising of heat resistant substrates by firing pads of conductor material, for example silver or silver-palladium, onto the substrate, adhesion of the metallising layer to the substrate may be good but the cohesive strength of the metallising layer is often low.

Expansion coefficients of substrates and metallising layers of conductors are often significantly different, leading to early metallising breakdown at only moderate temperatures.

Ordinary metal powders and formulations containing them have poor resistance to leaching by molten solders.

If desired, the heat resistant substrate particles may have applied thereto two or more coatings of different metals or alloys.

In addition to using metal powders in accordance with the invention for decorative purposes as already mentioned, the particles may be used as pelleted catalysts in, for example, oxidation and reduction reactions. Particular applications of such catalysts are:

(1) the purification of waste or tail gases from industrial plants; and (2) the purification of automobile exhaust gases.

What we claim is:

1. A method of making a metal powder comprising (i) activating particles of a heat resistant substrate which is a refractory material selected from the group consisting of clay, silica, alumina, titania, zirconia, silicon nitride, silicon carbide and mixtures thereof by boiling the particles in water or dilute mineral acid whereby the maximum surface area thereof becomes available for the nucleation and growth of metal or alloy thereon, then (ii) mixing said activated substrate particles with an aqueous or organic solution of a reducible compound of platinum, palladium, rhodium, ruthenium, iridium, osmium, gold or silver and reducing said compound by a reducing agent to the metal whereby the metal is nucleated onto the surface of individual substrate particles and, thereafter, (iii) growing further metal onto the resulting nucleated particles by further reduction.

2. A method according to claim 1, wherein step (i) is carried out in the presence of a reducing agent.

3. A method according to claim 1, wherein the reducing agent is hydrazine hydrate or sodium sulphite.

4. A method according to claim 3, wherein a colloidal protective agent is added to the activating agent prior to the addition of the suspension of heat resistant substrate particles thereto.

5. A method according to claim 4, wherein the colloidal protective agent is gum acacia, gelatin, egg albumin or dextrin.

* * * * *